United States Patent [19]

Müller

[11] Patent Number: 5,150,503
[45] Date of Patent: Sep. 29, 1992

[54] CONTINUOUS TENSIONING RING FOR MOUNTING CONVOLUTED BOOTS

[75] Inventor: Karl-Heinz Müller, Wissen, Fed. Rep. of Germany

[73] Assignee: GKN Automotive AG, Siegburg, Fed. Rep. of Germany

[21] Appl. No.: 717,388

[22] Filed: Jun. 19, 1991

[30] Foreign Application Priority Data

Jul. 7, 1990 [DE] Fed. Rep. of Germany ....... 4021746

[51] Int. Cl.⁵ ................................................. F16B 2/08
[52] U.S. Cl. ..................................... 24/20 EE; 29/521
[58] Field of Search ................ 24/279, 20 R, 20 CW, 24/20 EE, 20 TT, 20 W, 21, 22, 23 R, 23 W, 23 EE; 29/521

[56] References Cited

U.S. PATENT DOCUMENTS 3,039,340  6/1962  Livermont .
4,558,891 12/1985  Wagner et al. ................ 24/279 X
5,001,816  3/1991  Oetiker .......................... 24/20 R X

FOREIGN PATENT DOCUMENTS 4009259 10/1990  Fed. Rep. of Germany .
2086684 12/1971  France .
1071043  6/1967  United Kingdom .

Primary Examiner—James R. Brittain
Attorney, Agent, or Firm—Harness, Dickey & Pierce

[57] ABSTRACT

A continuous tensioning ring for mounting convoluted boots, consisting of an annular member rolled from flat strip material so as to be round, with the free ends of the strip being connected to each other. For this purpose the two free ends 12 and 13 are provided with claws 11 whose shapes are adapted to each other, which contact each other in the strip plane by engaging each other in a line-like way and which are caulked together in a force-locking way or spot-welded together in a material-locking way. The tensioning ring 10 is subsequently crimped, i.e. radially upset.

11 Claims, 2 Drawing Sheets

CONTINUOUS TENSIONING RING FOR MOUNTING CONVOLUTED BOOTS

The invention relates to a continuous tensioning ring for mounting convoluted boots, consisting of an annular member rolled from flat strip material so as to be round, with the free ends of the strip being connected to each other in such a way that the first free end and the second free end of the strip are provided with connecting clips whose shapes are adapted to each other, and connected to each other in the strip plane so as to engage each other.

Convoluted boots of elastomer materials are mounted by conventionally overlapping tensioning strips which, by tightening the two free strips ends with suitable means known in a variety of forms, achieve the required tensioning effect. In the region where the free strip ends abut, damage may occur at the boot, even if the strip ends overlap or engage each other in a stepped way.

There are prior art continuous annularly closed tensioning rings whose diameter may be reduced by crimping, i.e. carrying out a radial upsetting operation by means of suitable tools, as a result of which the boot is fixed. With crimping, the round annular shape is maintained maybe some edges caused by tool pressure are identifiable on the surface. Overall, these tensioning rings constitute very advantageous tensioning means which subject the boot to uniform loads.

Continuous tensioning rings have so far, in a first embodiment, been punched out as flat circular blanks which were then formed into cylindrical rings. Although it is possible, in an advantageous way, to produce seamless tensioning rings by this method, the forming process is expensive and, in addition, stresses may remain in the material. According to a second embodiment, lengths of strip are removed from the continuous trip material and rolled so as to become round, whereupon they are but-welded together perpendicularly to the centre line of the ring, especially by applying laser technology. With this method, the tensioning rings are non-circular after the assembly mandrel has been removed and they are uneven at the weld. Laser welding is very expensive.

From DE-PS 887 835 we know tensioning rings of the above-mentioned type in the case of which T-shaped connecting clips at one free end engage a suitable recess at the other free end, with both being positioned in one plane. With this method, there is a risk in that when the connection of the free ends is subjected to tensile loads, the externally positioned clip-like projections forming the recesses may be bent apart and twisted in the process. In consequence, the tensioning strip and possibly also the boot may be damaged.

It is the object of the present invention to provide tensioning rings of the initially mentioned type and a method of producing them, with such tensioning rings having a higher load bearing capacity and being suitable for being produced at lower cost in an improved quality.

The objective is achieved in that externally positioned connecting clips at the first free end each embrace, and engage from behind, an internally positioned connecting clip at the second free end and that matching inclined regions at the connecting clips are aligned in such a way that when a tensile load is applied to the connection between the free ends, inwardly directed forces act on the externally positioned connecting clips.

The connecting clips may be connected to each other in a point-like way. Point-like connecting in this context means point-like caulking of abutting edges or spot welding, with the two methods either constituting alternatives or complementing each other, with the strip ends being secured by engaging each other in a form-fitting way. By carrying out the subsequent crimping operation it is possible, independently of the initially selected fixing method, to ensure secure tensioning along the contact lines in the strip plane by upsetting the material. The strip ends form-fittingly engaging each other one behind the other via inclined portions withstand higher loads than prior art connections. A particularly cost-effective and secure method consists in producing a cold connection exclusively via clamping points.

In a first embodiment, the first free end is provided with a substantially T-shaped head piece and the second free end with a claw-shaped fork element adapted to the first free end, with the two free ends engaging each other by abutting in a line-like way. The inclined portions ensure that the free ring ends engage in a swallow-tail-like way. It is possible for several swallow-tail-shaped or T-shaped clips to be provided on the width of the ring, which especially applies to wide tensioning rings.

Instead of one single T-shaped or swallow-tail-like clip, it is also possible for several such clips to pass into each other in the direction of the centre line of the tensioning ring, thereby achieving a fir-tree-like or telegraph-post-like clip design.

According to a preferred embodiment of the respective production method, an annular member taken from continuous strip material is rolled on a mandrel so as to become round and cut to length in such a way that claws are produced at both strip ends, which are then connected to each other in a form-fitting way, with point-like connections being achieved by clamping points radially stamped on from the outside or by spot welding undertaken radially from the outside. In this way it is possible to provide a method by means of which it is possible, at low cost, to produce low-stress rings of cold-formed strip material to be fixed on convoluted boots by crimping.

The invention is illustrated in the enclosed drawing and will be described in more detail below.

Figure 1:
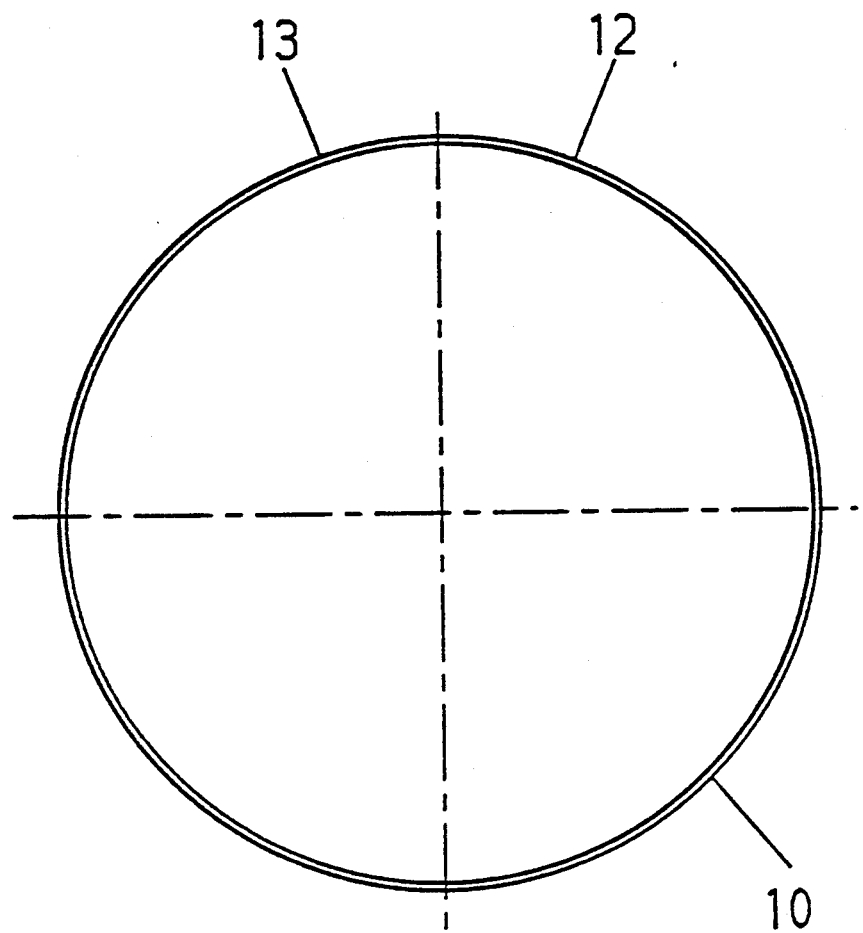
FIG. 1 is an axial view of a strip portion joined to form a tensioning ring.
Figure 2:
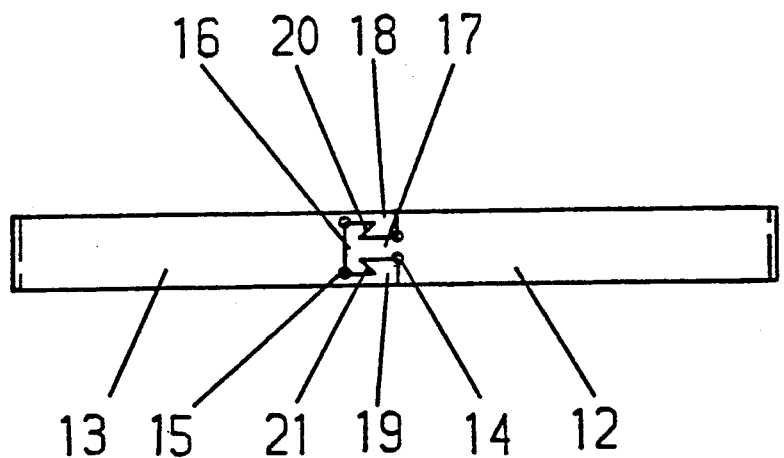
FIG. 2 is a plan view of a tensioning ring according to FIG. 1 with the free ends engaging each other in a claw-like way.

The tensioning ring shown in FIGS. 1 and 2 consists of a strip portion rolled so as to become annular, having a first free end 12 and a second free end 13. The free ends 12 and 13 are provided with claws which engage each other in the strip plane in a form-fitting way. In the case of the embodiment shown, the first free end 12 is provided with a T-shaped connecting clip 16 having a central web 17 which is symmetrical relative to the centre line. The second free end 13 is provided with external connecting clips 18, 19, with the return portions 20, 21 each constituting inclined portions engaging each other in such a way that, in the case of tensile loads, the connecting clips 18, 19 are drawn inwardly. The line of abutment is symmetrical relative to the centre line in the circumferential direction of the ring and extends meander-like between the two edges of the ring. There are provided first clamping points 14 at the front edge of the connecting clip 16 and second clamping points 15 at the front edges of the connecting clips 18, 19. Via the clamping points 14, 15, the claw-like engagement between the free ends 12 and 13 are closed in a form-fitting and force-locking way, so that a continuous tensioning ring 10 is obtained.

Figure 3:
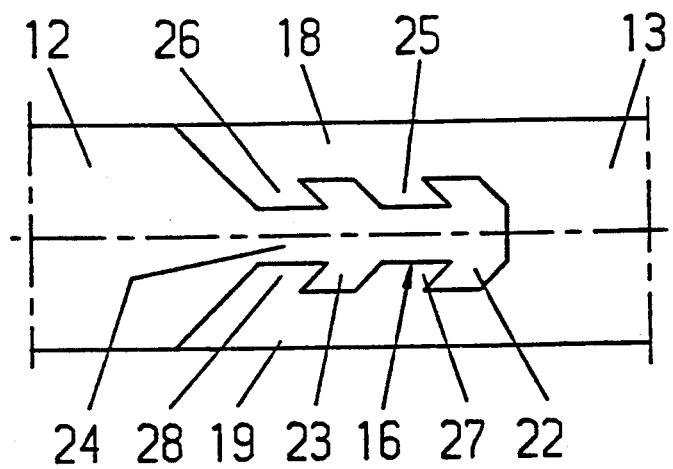
FIG. 3 shows a modification of a claw-like engagement according to FIG. 2.

In the embodiment to FIG. 3, the strip ends 12, 13 are each provided with a telegraph-pole-shaped or double cross T-shape connecting clip 16 with several double hooks 22, 23 at the central web 24 and double-hook-shaped connecting clips 18, 19 having two hooks 25, 26, 27, 28 each. Otherwise, the reference numbers are the same as in FIG. 2.

Figure 4:
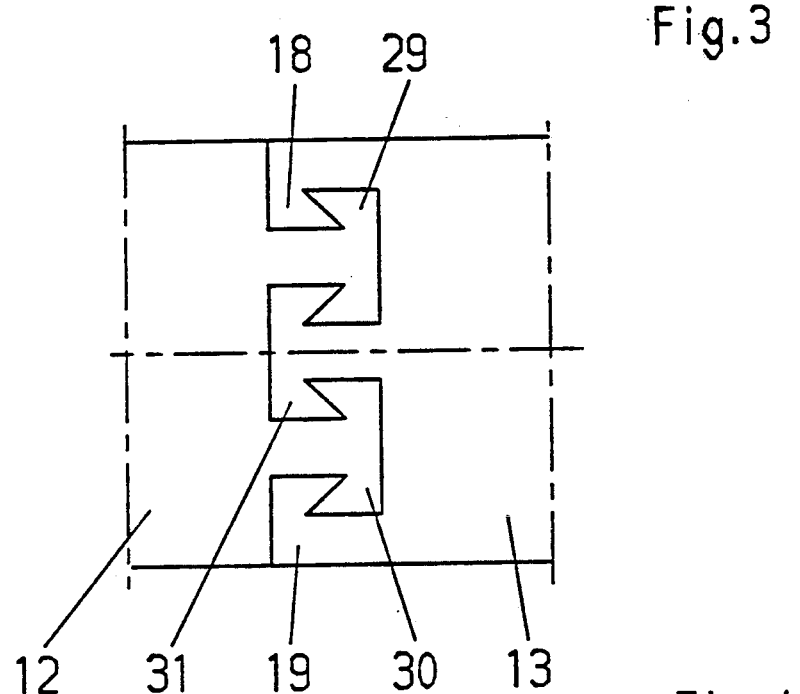
FIG. 4 shows multiple clawing between the free ends.

In FIG. 4, the strip ends 12, 13 are provided with external connecting clips 18, 19 at the second strip end, internally positioned connecting clips 29, 30 at the first strip end 12 and an interengaging connecting clip 31 which again is connected to the second strip end 13. The connecting clips 18, 19 are each provided with inwardly directed hooks, whereas the connecting clips 29, 30, 31 are provided with T-shaped double hooks at their ends.

Figure 5:
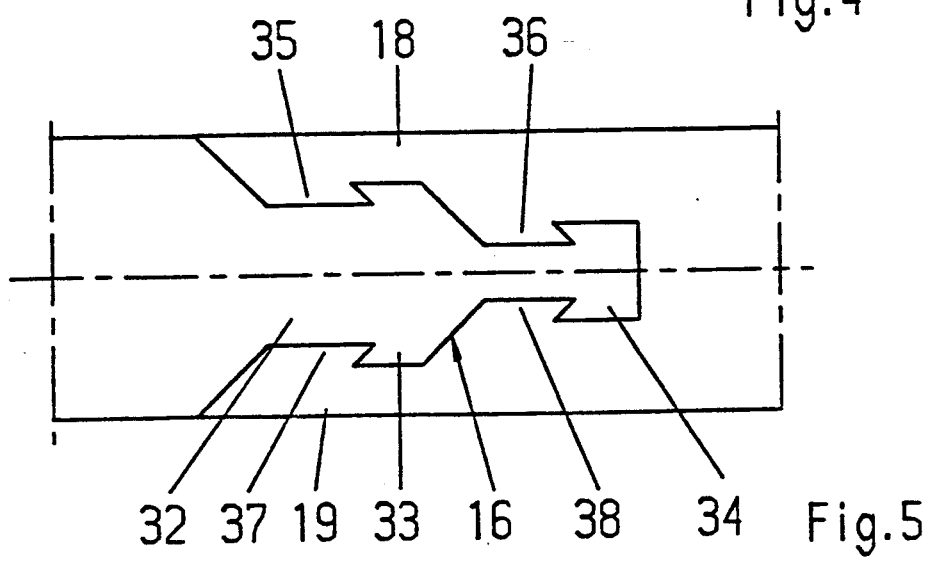
FIG. 5 shows a modification of the claw-like engagement according to FIG. 2.

In FIG. 5, a swallow-tail-shaped connecting clip 16 with a stepped central web 32 is complemented by double hooks 33, 34 in a fir-tree-like or double cross T-shape way, said double hooks cooperating with complementary hooks 35, 36, 37, 38 at the connecting clips 18, 19. The clamping points are not illustrated in detail in FIGS. 3 to 5.

LIST OF REFERENCE NUMBERS 12 strip end
13 strip end
14 clamping point
15 clamping point
16 clip (T-shaped)
17 central web
18 clip (external)
19 clip (external)
20 return portion
21 return portion
22 double hook
23 double hook
24 central web
25 hook (external)
26 hook (external)
27 hook (external)
28 hook (external)
29 clip (internal)
30 clip (internal)
31 clip (central)
32 central web
33 double hook
34 double hook
35 hook (external
36 hook (external)
37 hook (external)
38 hook (external)

I claim:

1. A continuous tensioning ring for mounting convoluted boots, consisting of an annular member rolled from flat strip material so as to be round, with free ends of the strip being connected to each other in such a way that a first free end and a second free end of the strip are provided with connecting clips whose shapes are adapted to each other, and connected to each other in the strip plane so as to engage each other, comprising externally positioned connecting clips at the first free end and an internally positioned connecting clip at the second free end, said external clips, each having a claw with an engaging face in a plane at an acute angle with respect to a longitudinal axis of the strip, each embrace, and engage from behind, said internal clip having a pair of claws with engaging faces in a plane at an acute angle with respect to the strip longitudinal axis such that said internal clip claws engaging faces engage said external clip engaging faces such that the clips are aligned in such a way that when a tensile load is applied to the connection between the free ends inwardly directed forces act on the externally positioned connecting clips.

2. A tensioning ring according to claim 1, wherein several T-shaped engaging connections are provided on the width of the ring.

3. A tensioning ring according to claim 2, wherein the engaging connections are caulked to each other in the plane of the tensioning ring by clamping points extending symmetrically relative to the central line of the tensioning ring.

4. A tensioning ring according to claim 2, wherein the engaging connections are connected to each other by spot welds arranged symmetrically relative to the center line of the tensioning ring.

5. A tensioning ring according to claim 1, wherein several engaging connections in the shape of a double crossed T are provided in the circumferential direction of the ring.

6. A tensioning ring according to claim 5, wherein the engaging connections are caulked to each other in the plane of the tensioning ring by clamping points extending symmetrically relative to the central line of the tensioning ring.

7. A tensioning ring according to claim 5, wherein the engaging connections are connected to each other by spot welds arranged symmetrically relative to the center line of the tensioning ring.

8. A tensioning ring according to claim 1, wherein the engaging connections are caulked to each other in the plane of the tensioning ring by clamping points extending symmetrically relative to the central line of the tensioning ring.

9. A tensioning ring according to claim 1, wherein the engaging connections are connected to each other by spot welds arranged symmetrically relative to the center line of the tensioning ring.

10. A method of producing a continuous tensioning ring of flat strip material for mounting convoluted boots, ends of the ring being connected to each other comprising:
    separating a length of strip material from a continuous strip material;
    providing the strip ends with corresponding claws with externally positioned connecting clips at the first free end and an internally positioned connecting clip at the second free end, said external clips, each having a claw with an engaging face in a plane at an acute angle with respect to a longitudinal axis of the strip, each embrace, and engage from behind, said internal clip having a pair of claws with engaging faces in a plane at an acute angle with respect to the strip longitudinal axis such that said internal clip claws engaging faces engage said external clip engaging faces such that the clips are aligned in such a way that when a tensile load is applied to the connection between the free ends inwardly directed forces act on the externally positioned connecting clips;

bending said strip on a mandrel to form a ring;

form-fittingly connecting the ends to each other;

caulking the form-fitting connections together in a form-locking way by clamping points applied from the outside.

11. A method of producing a continuous tensioning ring rolled of flat strip material for mounting convoluted boots, with the free ends of the ring being connected to each other comprising:

separating a length of strip material from a continuous strip material;

providing the strip ends with corresponding claws externally positioned connecting clips at the first free end and an internally positioned connecting clip at the second free end, said external clips, each having a claw with an engaging face in a plane at an acute angle with respect to a longitudinal axis of the strip, each embrace, and engage from behind, said internal clip having a pair of claws with engaging faces in a plane at an acute angle with respect to the strip longitudinal axis such that said internal clip claws engaging faces engage said external clip engaging faces such that the clips are aligned in such a way that when a tensile load is applied to the connection between the free ends inwardly directed forces act on the externally positioned connecting clips;

bending said strip on a mandrel to form a ring;

form-fittingly connecting the end to each other;

welding the form-fitting connection in a material-locking way with spot welds applied from the outside.

* * * * *